J. C. LINDSEY.
WEEDER.
APPLICATION FILED OCT. 28, 1911.
1,036,283.
Patented Aug. 20, 1912.
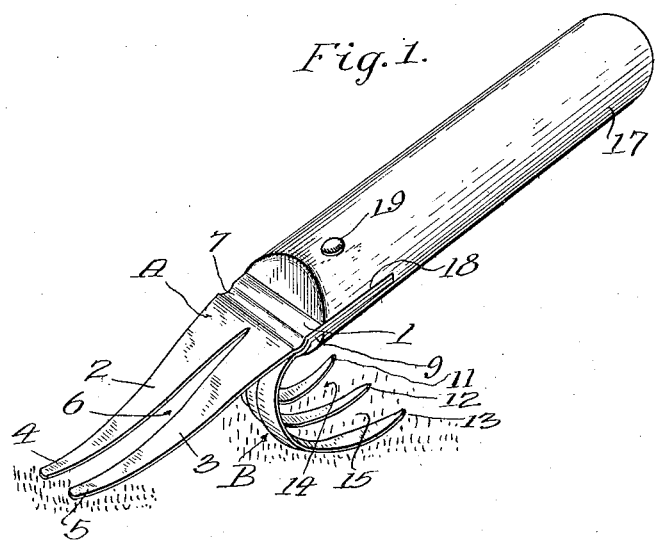
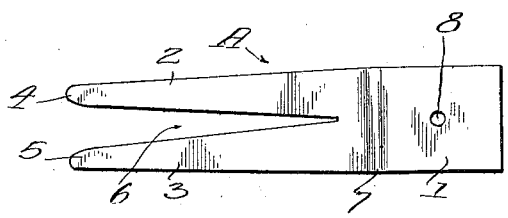
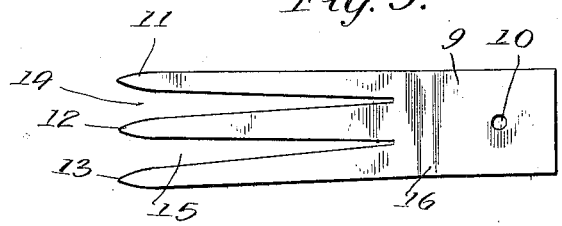
Witnesses:
W. S. Nellis
F. Williams
Inventor
John C. Lindsey
by Wells & Williams
his Attorneys

UNITED STATES PATENT OFFICE.

JOHN C. LINDSEY, OF LOS ANGELES, CALIFORNIA.

WEEDER.

1,036,283.

Specification of Letters Patent.

Patented Aug. 20, 1912.

Application filed October 28, 1911. Serial No. 658,272.

*To all whom it may concern:*

Be it known that I, JOHN C. LINDSEY, a citizen of the United States, residing at Los Angeles, California, have invented a new and useful Weeder, of which the following is a specification.

My object is to make a tool for the use of landscape gardeners in pulling weeds from a lawn and in raking devil grass from the lawn, and my invention consists of the novel features herein shown, described and claimed.

In the drawings:—Figure 1 is a perspective of a weeder embodying the principles of my invention. Fig. 2 is a plan view of the weed puller stamping. Fig. 3 is plan of the rake stamping before it is bent.

Referring to the drawings in detail—the weed puller stamping A is made from sheet metal and comprises the flat head 1 and the weed puller claws 2 and 3 extending from the head, said claws being tapered to their points 4 and 5, thus forming the tapered slot 6 between the claws. The metal of the head 1 has a transverse groove 7 pressed downwardly and a rivet hole 8 near its opposite end from the claws 2 and 3.

The rake stamping B is formed from sheet metal and comprises the head 9 having a rivet hole 10 registering with the rivet hole 8, and the rake teeth 11, 12 and 13 extending from the head. The rake teeth are tapered and spread apart so as to form tapered slots 14 and 15 between the teeth. The metal of the head 9 has a transverse groove 16 fitting the metal of the groove 7. The handle 17 has a transverse slot 18 formed from its end face to receive the heads 1 and 9 and a rivet 19 is inserted through the handle and through the rivet holes 8 and 10 to hold the stampings A and B securely in place. The grooved portions 7 and 16 fit each other so as to hold one stamping from turning upon the rivet independent of the other stamping. The rake teeth 11, 12 and 13 are curved downwardly and backwardly relative to the weed pulling claws 2 and 3, said claws being curved slightly upwardly toward their points. The rake teeth serve as a fulcrum for pulling the weeds and the handle serves as a lever. The points of the claws are placed close to the ground so as to embrace the weed and the device is pushed forwardly until the weed is drawn tightly into the slot 6. When desired, the device is used as a rake, the teeth 11, 12 and 13 serving to scratch up the devil grass and the like from the lawn.

I claim—

A weeder comprising, a weed puller stamping; a rake stamping; and a handle holding the two stampings together, the said weed puller stamping comprising a head and weed pulling claws extending from the head and forming a tapered slot, said claws being curved slightly upwardly from their points and there being a transverse groove in the head, the said rake stamping comprising a head and rake teeth extending from the head, said rake teeth being curved downwardly and backwardly and there being a groove in the head fitting the first groove and said heads being placed together flatwise and inserted into a slot formed from the end of the handle and secured in place.

JOHN C. LINDSEY.

Witnesses:
CLARENCE J. WILLIAMS,
HENRY H. ROSER.

Copies of this patent may be obtained for five cents each, by addressing the "Commissioner of Patents, Washington, D. C."